United States Patent [19]

Weber

[11] Patent Number: 4,496,862
[45] Date of Patent: Jan. 29, 1985

[54] HIGH SPEED GENERATOR AIR VENT FOR AIR GAP

[75] Inventor: Kent Weber, Rockford, Ill.

[73] Assignee: Sundstrand Corporation, Rockford, Ill.

[21] Appl. No.: 520,725

[22] Filed: Aug. 5, 1983

[51] Int. Cl.³ .......................... H02K 1/32; H02K 9/26
[52] U.S. Cl. ...................................... 310/56; 310/54; 310/60 A; 310/86
[58] Field of Search ............... 310/52, 54, 56, 58, 310/59, 60 R, 60 A, 61, 63, 64, 86, 88, 90

[56] References Cited

U.S. PATENT DOCUMENTS

| | | | |
|---|---|---|---|
| 2,950,402 | 8/1960 | Glaza | 310/56 |
| 3,229,130 | 1/1966 | Drouard | 310/86 |
| 3,261,295 | 7/1966 | White | 103/87 |
| 3,445,695 | 5/1969 | Schultz | 310/58 |
| 3,577,024 | 5/1971 | Inagaki | 310/61 |
| 3,588,290 | 6/1971 | Kreutzkampf | 417/370 |
| 3,617,782 | 11/1971 | Nakamura | 310/61 |
| 3,618,337 | 11/1971 | Mount | 62/505 |
| 3,629,628 | 12/1971 | Rank | 310/54 |
| 3,740,596 | 6/1973 | Curtis et al. | 310/54 |
| 3,742,266 | 6/1973 | Heller et al. | 310/54 |
| 3,774,060 | 11/1973 | Sharpe et al. | 310/52 |
| 4,114,059 | 9/1978 | Albaric et al. | 310/54 |
| 4,152,611 | 5/1979 | Madsen | 310/61 |
| 4,164,126 | 8/1979 | Laskaris et al. | 62/55 |
| 4,203,044 | 5/1980 | Linscott, Jr. | 310/61 |
| 4,284,913 | 8/1981 | Barnhardt | 310/54 |
| 4,380,712 | 4/1983 | Intichar et al. | 310/52 |
| 4,445,056 | 4/1984 | Gaylord | 310/54 |

Primary Examiner—William M. Shoop
Assistant Examiner—D. L. Rebsch
Attorney, Agent, or Firm—Wood, Dalton, Phillips, Mason & Rowe

[57] ABSTRACT

A rotary electric machine including a stator, a rotor separated from the stator by an air gas journalled for rotation relative to the stator about an axis of rotation and electrical windings carried by at least one of the rotor and the stator. A cooling liquid flow path is provided for cooling the windings and a gas vent passage is disposed in the rotor, to open to the air gap and introduce gas into the gap, to prevent the entry of liquid coolant and/or drive accumulated liquid coolant out of the air gap.

6 Claims, 1 Drawing Figure

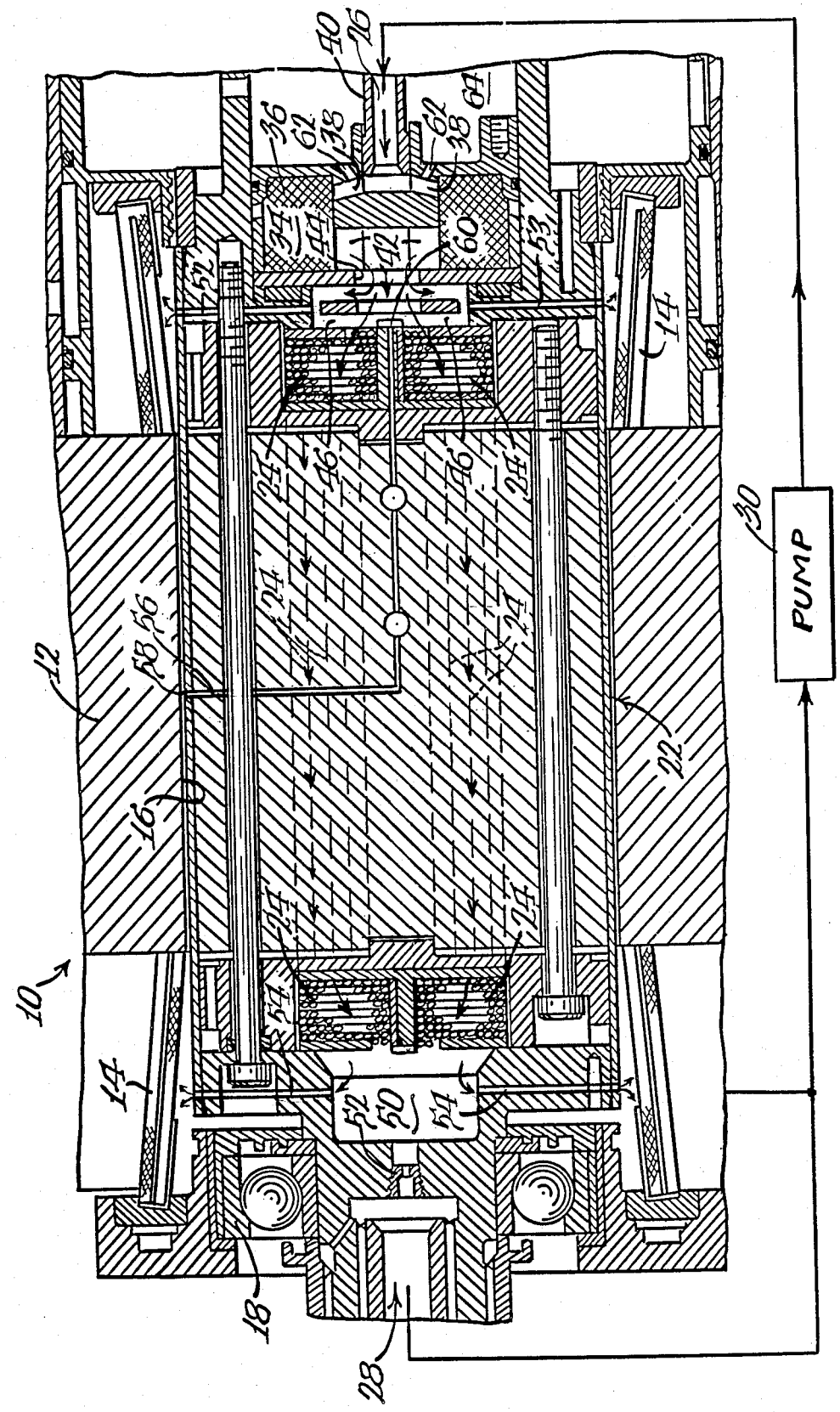

HIGH SPEED GENERATOR AIR VENT FOR AIR GAP

TECHNICAL FIELD

This invention relates to rotary electric machines, and more specifically, rotary electric machines having liquid cooled rotors and an air vent path for venting air entrained in the liquid coolant to the stator air-gap to prevent the accumulation of liquid coolant in the gap.

BACKGROUND ART

In order to maximize the capacity of various rotary electric machines as, for example, generators, it is desirable to provide liquid cooling for various components such as windings. For example, it is not uncommon to spray a liquid coolant such as oil on the end turns of stator windings.

In many instances, this does not pose a particular problem. However, in the case of high speed rotary machines, the liquid coolant may enter the air gap between the rotor and the stator. The resulting churning of the coolant produces sizable drag losses on the machine with the consequence that the losses caused by such drag minimize or even exceed the increase in capacity achieved by liquid cooling.

In order to solve this difficulty, the prior art has typically resorted to the use of one or more physical barriers that are interposed between the windings being cooled and the air gap for the purpose of preventing the liquid coolant from traveling to the air gap. In addition to complicating the construction of the rotary electric machine, such barriers may also have an effect on its efficiency in that their presence frequently tends to increase the length of the magnetic flux path thus reducing magnetic efficiency of the device to some extent.

The present invention is directed to overcoming one or more of the above problems.

SUMMARY OF THE INVENTION

It is the principal object of the invention to provide a new and improved liquid cooled rotor in a rotary electric machine provided with a unique air vent to prevent the build-up of liquid coolant in the rotor-stator air gaps.

An exemplary embodiment of the invention includes a stator with a rotor journalled for rotation relative to the stator about an axis of rotation. Electrical windings are carried by at least one of the stator and the rotor. The rotor also includes a fluid inlet. Means including a cooling liquid flow path are located in the rotor to interconnect the inlet and an outlet, the liquid flow path being in heat exchange relation to the windings, with at least a part thereof displaced from the axis of rotation. A gas vent passage opening to the air gap is located in the rotor and introduces gas to the air gap to drive any liquid coolant out of the gap.

In a highly preferred embodiment, the vent passage is sized to prevent substantial flow of a liquid.

Preferably, the gas vent is interconnected with the cooling liquid flow path in such a way that gas entrained in the coolant or introduced into the rotor with the coolant are separated during operation of the device by centrifugal force.

Other objects and advantages will become apparent from the following specification taken in connection with the accompanying drawings.

BRIEF DESCRIPTION OF THE DRAWING

The FIGURE is a sectional view of a rotary electric machine, specifically a high speed alternator, made according to the invention with certain components shown in somewhat schematic form.

BEST MODE FOR CARRYING OUT THE INVENTION

An exemplary embodiment of a rotary electric machine made according to the invention is illustrated in the drawing in the form of a high speed alternator. However, it should be understood that the invention can be employed with efficacy in other types of rotary electric machines wherein rotor cooling by a liquid coolant which may entrain gases is employed. The rotary electric machine includes a stator armature, generally designated 10, having a steel core 12, windings 14, and a rotor/stator air gap 16. Bearings such as those shown at 18 mounted on a housing component 20 serve to journal a rotor, generally designated 22, for rotation relative to the stator 10 within the gap 16 for rotation about the rotor axis.

In the particular form of the machine illustrated, the alternator is of the so-called brushless variety and includes windings 24 extending from end to end of the rotor 22 as illustrated. The windings receive a direct current to generate a magnetic field which in turn rotates upon rotation of the rotor to induce current in the windings 14 of the stator 10.

The rotor includes a fluid inlet, generally designated 26, on one end and a fluid outlet, generally designated 28, on the opposite end. A fluid system including a pump 30 recirculates the liquid coolant from the outlet 28 to the inlet 26. A heat exchanger (not shown) for cooling the coolant may also be employed.

The inlet 26 includes a chamber 34 within the rotor. A centrifugal filter 36 is disposed in the radially outer part of the chamber 34. Generally radially extending entrance ports 38 interconnect the chamber 34 and the exit end of a tube 40 connected to the pump 30 by means including a rotary coupling.

Axially inwardly of the ports 38, the chamber 34 opens radially inwardly in exit ports 42 to a centrally apertured plate 44, the aperture in the plate 44 being concentric with the rotational axis of the rotor 22.

Radial passages 46 extend generally radially outwardly from the rotational axis to allow liquid to flow into heat exchange relationship with the end turns of the windings 24 and through passages defined by the interstices between windings extending axially along the rotor to the opposite end turns where the coolant may emerge in a central chamber 50 concentric about the rotational axis of the rotor 22. A flow path including an orifice 52 interconnects the chamber 50 with the outlet 28.

As seen in the FIGURE, generally radial passages 53 in alignment with the end turns of the stator windings 14 extend from the radial passages 46 to the periphery of the rotor 22. As a consequence of this construction, coolant may be directed at such windings 14 for cooling purposes. Similar passages 54 interconnect to the central chamber 50 at the opposite end of the rotor for spraying the opposite end turns of the windings 14 with coolant.

As noted previously, it is highly desirable to prevent the liquid coolant being used to cool the end turns 14 from entering the air gap 16 or, if such coolant does in fact find its way to the air gap 16, to cause the same to be promptly removed to avoid high drag losses caused by the churning of such coolant in the air gap 16 during machine operation. To this end, the rotor 22 is provided with a vent passage 56 having an opening 58 on the rotor periphery to the air gap 16, generally centrally located. The vent passage 56 also has an opposed end 60 which opens to the center of the radial passages 46 and thus is in fluid communication with the chamber 34. The end 60 is on the axis of rotation of the rotor 22 for purposes to be seen.

During operation of the machine, gas, usually in the form of air, will be expelled via the vent passage through the end 58 at the center of the air gap 16. Such air will, of course, move any accumulated coolant in the air gap axially outwardly of the air gap should any be present, and further, will prevent any coolant adjacent the air gap from moving axially inwardly into the same, to cause undesirable drag losses.

Gas for the purpose is typically available in the form of air entrained in the coolant being circulated through the previously described flow path. Alternately, it may be introduced to the flow path by means including ports 62 in fluid communication with the passages 38 and an adjacent chamber 64.

In either event, the gas so introduced is separated from the liquid coolant by centrifugal force during operation of the machine. The coolant, usually oil, has a higher density than air, with the consequence that the centrifugal force causes it to migrate radially outwardly to the outer portions of the flow path leaving the air at a radially inward location. Thus, the air tends to accumulate on the axis of rotation of the rotor where it may freely flow under the pressurization of incoming oil or any auxiliary pressure source to the end 60 of the vent passage to be forced through and emerge from the vent outlet 58. Thus, the chamber 36 and the construction of components including the opening 44 and the radial passages 46 act as an air-oil separator carried by the rotor itself.

It is to be noted that in the usual case, the flowing air will be a minor percentage of the total flow of fluid and by using conventional compressible fluid flow calculations, the cross sectional dimension of the vent passage 56 may be determined so as to make it sufficiently small as to create a sufficient back pressure to preclude the entrance of liquid coolant thereinto. Similarly, the spray passages 53 and 54 should be of sufficiently small size as to create a sufficient back pressure to liquid coolant flow as to prevent air from exiting such passages, since it would interfere with the desired cooling action provided by the liquid coolant.

From the foregoing, it will be appreciated that a rotary electric machine made according to the invention incorporates the desirability of liquid cooling of windings in a high speed rotary electric machine while avoiding the deleterious effects of the entry of liquid coolant into the stator-rotor air gap. Moreover, this accomplishment does not require the presence of special barriers which may decrease the magnetic efficiency of the device. Furthermore, the separation of air from the liquid coolant assures maximum cooling efficiency, since the windings are contacted with relatively gas free liquid coolant having a higher heat capacity than air, to assure maximum cooling for a given volume of fluid passed over such windings.

I claim:

1. In a rotary electric machine, the combinaton of:
   a stator;
   a rotor having an outermost periphery spaced from said stator by an air gap and journalled for rotation relative to the stator about an axis of rotation;
   electrical windings carried by at least one of said stator and said rotor;
   a fluid inlet on said rotor;
   a fluid outlet on said rotor spaced from said fluid inlet;
   means, including a cooling liquid flow path, in said rotor interconnecting said inlet and outlet, said liquid flow path being in heat exchange relation to said windings with at least a part thereof displaced from said axis of rotation; and
   a gas vent passage in said rotor for said liquid flow path and opening at said outermost periphery to said air gap.

2. The rotary electric machine of claim 1 wherein said vent passage is sized to prevent substantial liquid coolant flow.

3. The rotary electric machine of claim 1 wherein said vent passage in in fluid communication with said inlet.

4. In a rotary electric machine, the combination of:
   a stator;
   a rotor journalled for rotation relative to the stator about an axis of rotation and spaced from said stator by an air gap;
   electrical windings carried by at least one of said stator and said rotor;
   means defining a cooling liquid flow path in the rotor and in heat exchange relation to said windings and extending across said air gap; and
   means for directing gas to said air gap to prevent cooling liquid from entering the same.

5. In a rotary electric machine, the combination of:
   a stator;
   a rotor separated from said stator by an air gap and journalled for rotation relative to the stator about an axis of rotation;
   electrical windings carried by said stator;
   means defining a cooling liquid flow path in the rotor in heat exchange relation to said windings and displaced from said axis; and
   a gas vent in said rotor to said air gap and in fluid communication with said liquid flow path and having a portion located substantially on said axis of rotation, said vent passage having a cross sectional area that is a minor fraction of the cross sectional area of said liquid flow path to prevent substantial flow of liquid therethrough, said liquid flow path and said vent passage being in fluid communication with each other by a connection disposed substantially on said axis of rotation, whereby liquid and gas are separated from each other by centrifugal force with the gas passing to said air gap through said vent to prevent coolant liquid from accumulating in the same.

6. The rotary electric machine of claim 1 wherein said gas vent passage serves as a means for directing gas to said air gap to prevent cooling liquid from entering the same.

* * * * *